Sept. 8, 1936. C. H. LARSON Re. 20,100

TIME DELAY MERCURY SWITCH

Original Filed Jan. 7, 1933

Inventor
Carl H. Larson
By Gilson, Mannix & Ellis
Attys

UNITED STATES PATENT OFFICE 20,100

TIME DELAY MERCURY SWITCH

Carl H. Larson, Elkhart, Ind., assignor to The Adlake Company, a corporation of Illinois Original No. 1,967,950, dated July 24, 1934, Serial No. 650,656, January 7, 1933. Application for reissue June 5, 1936, Serial No. 83,819

14 Claims. (Cl. 200—97)

The principal object of this invention is to provide a mercury switch capable of effecting a quick make and slow break of an electrical circuit upon operation of the switch actuating mechanism.

Further and other objects and advantages will become apparent as the disclosure proceeds and the description is read in conjunction with the accompanying drawing, in which Fig. 1 is a vertical, sectional view of a front contact mercury switch made in accordance with this invention, the associated coil being shown deenergized;

Figure 1:
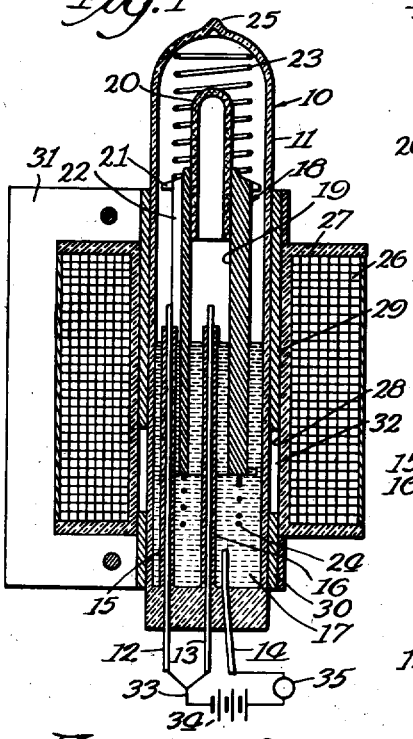
Figure 2:
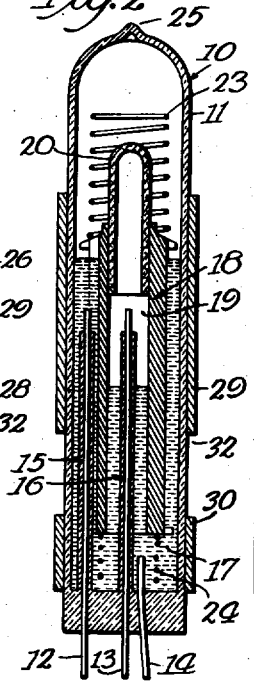
Fig. 2 illustrates the position of the switch parts immediately after the coil is energized.
Figure 3:
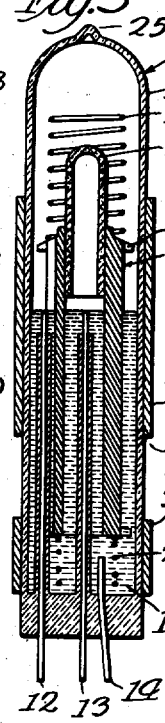
Fig. 3 shows the mercury covering the two tall electrodes after equilibrium has been established.

The following detailed description of specific embodiments of the invention is for the purpose of disclosure only and should not be construed as imposing limitations upon the appended claims except as required by the prior art.

Referring first to Figs. 1 to 4, inclusive (showing one adaptation of the invention), the mercury switch 10 comprises a glass envelope 11 into the bottom of which electrodes 12, 13 and 14 are suitably sealed. The electrodes 12 and 13 project upwardly within the envelope to substantially the same height, and are protected by insulation sleeves 15 and 16 which extend to a point slightly above the normal level of mercury 17. A displacer 18, magnetically controlled, is adapted to change the level of the mercury to bridge the electrodes 12 and/or 13 with the electrode 14.

The displacer 18 is made of suitable magnetic material, such as iron, or magnetic material combined with some other material having desirable characteristics. For example, the lower part of the displacer 18 may be lined with a ceramic material, or glass to give the displacer additional buoyancy.

The upper part of the displacer is provided with a central aperture 19 into which an inverted thimble 20 of porous material is fitted. The porous material is preferably a ceramic, and a product known as "Alundum" manufactured by the Norton Company, Worcester, Massachusetts has been found very satisfactory. One of three principal grades R—A—84, dense, R—A—360 medium, and R—A—98 coarse, may be selected, according to the specifications of the switch.

The displacer is provided with laterally extending lugs 21 which guide the displacer in its vertical movement within the envelope. A longitudinal groove 22 cut into the side of the displacer accommodates the electrode 12 and thereby makes possible a smaller switch envelope. Tests have shown that the groove has a tendency to minimize eddy currents when the switch is operated on alternating current and the efficiency of the switch is correspondingly increased.

Springs 23 and 24 cushion the displacer from the ends of the envelope and protect the envelope from breakage due to rough handling in shipment, or excessive magnetic forces.

After the electrodes 12, 13, and 14 have been sealed into the bottom of the envelope 11 and the charge of mercury 17 and displacer 18 have been placed in the envelope, a vacuum pump is attached to the open end to draw out all air within the envelope and replace it with a suitable gas fill such as helium, hydrogen, nitrogen, or the like. The envelope is then sealed off at 25.

The switch actuating mechanism comprises a coil 26 wound upon a spool 27 having a central aperture 28 adapted to receive circular pole sleeves 29 and 30. The pole sleeves are made of magnetic material and with the iron yoke 31, which is preferably laminated, form a magnetic circuit which is complete except for the air gap 32. When the coil 26 is energized, the displacer 18 is drawn downwardly in its effort to close the air gap, and mercury is consequently displaced.

The electrodes 12 and 13 are intended, in this embodiment of the invention, to be connected by a common lead 33 which may be connected to one side of the battery 34 or other source of electrical energy. The electrode 14 may be connected through a load 35 to the other side of the battery. This simple circuit is sufficient to show the manner in which the switch may be used, but obviously other circuits may be employed.

The switch shown in Fig. 1 is termed a front contact switch because the electrical circuit through the electrodes is held open as long as the coil 26 is deenergized. As soon as the coil is energized, the displacer 18 is immediately lowered and the mercury level on the outside of the displacer rises to the position shown in Fig. 2. The bared portion of the electrode 12 thus comes in contact with the mercury and the electrical circuit through the electrodes 12 and 14 is at once completed.

Although the electrode 12 is immediately placed in contact with the mercury by the lowering of the plunger, the electrode 13 is not covered with mercury until the gas which is trapped within the plunger has had an opportunity to escape through the porous thimble 20. When the pressures on the inside and outside of the displacer have been equalized after a given time interval, the mercury takes the position shown in Fig. 3. At no time during this equalizing of pressures on the inside and outside of the displacer does the mercury fall below the bared portion of the electrode 12.

Figure 4:
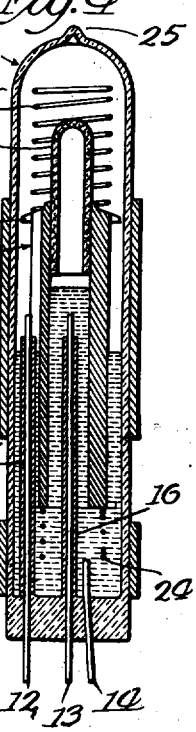
Fig. 4 shows the position of the switch parts immediately after the coil is deenergized.

When the coil 26 is deenergized, the displacer 18 immediately rises to the position shown in Fig. 4 drawing up with it a column of mercury within the displacer. Although the bared portion of the electrode 12 is at once uncovered by the rising of the displacer, the electrical circuit through the load remains unbroken until sufficient gas has been admitted to the interior of the displacer 18 through the porous wall 20 to permit the mercury column within the displacer to fall to its normal level. Consequently, the breaking of the electrical circuit is timed according to the rate at which the gas is allowed to enter the displacer.

From the above, it is clear that the switch effects a quick make and slow break of the electrical circuit. The time interval for the breaking of the electrical circuit may be governed by the selection of suitable material for the porous thimble 20, the particular gas fill, the height of the electrodes, the mercury fill, and other variables.

It will be understood that any suitable restricted passageway in the top of the displacer 18 will produce a like result, and this invention is not limited to the use of a porous material for the gas relief vent.

Figure 5:
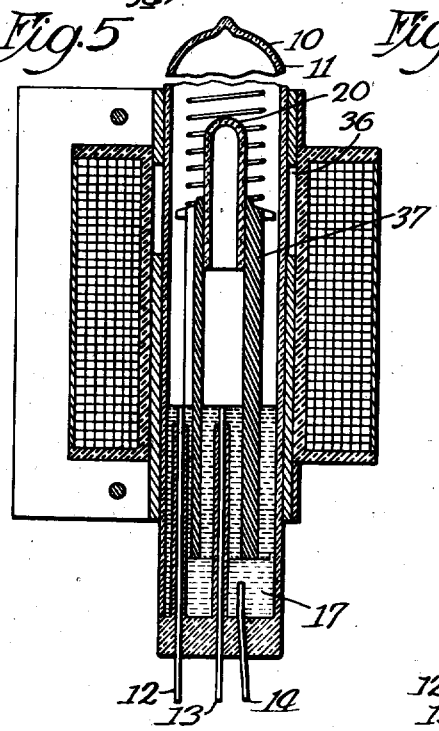
Fig. 5 is a vertical, sectional view of a back contact mercury switch made in accordance with this invention, the associated coil being shown deenergized.
Figure 6:
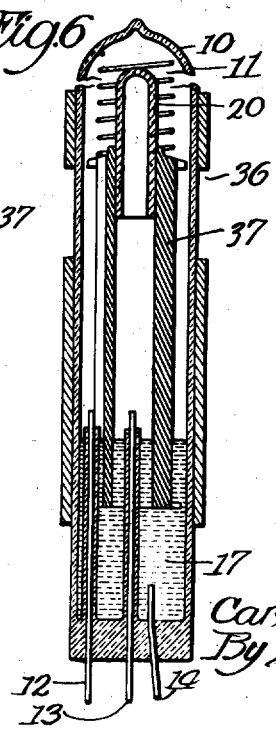
Fig. 6 illustrates the open circuit position of the switch shown in Fig. 5.
Figure 7:
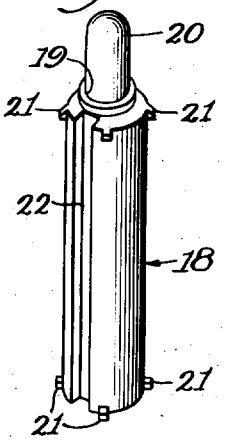
Fig. 7 is a perspective view of the displacer.

In Figs. 5 and 6, there is illustrated a modification of the invention, in which the switch is of the back contact type. In other words, the electrical circuit through the electrodes is closed when the associated coil is deenergized, and opened when the coil is energized. To accomplish this, the air gap 36 in the magnetic circuit is placed adjacent to the top of the envelope and the displacer 37 is of somewhat heavier construction to compensate for the difference in the forces of gravity and buoyancy. The operation of the switch, however, is virtually the same as the front contact switch shown in Figs. 1–4 inclusive, the only difference being that magnetic force is used for lifting the displacer (instead of buoyancy, as in Fig. 4,) and gravity is relied upon for lowering the displacer (instead of the magnetic force used in Fig. 2).

What I claim, therefore, is:

1. In a mercury switch adapted to effect a quick make and slow break of an electrical circuit, the combination of a switch envelope, spaced electrodes in the envelope, two of which are connected to a common lead, a charge of mercury in the envelope adapted to make or break an electrical circuit, according to its level, between said two electrodes and another electrode, a displacer for changing the mercury level, said displacer being telescoped over one of said two electrodes and being equipped with means for slowly equalizing the pressures on the inside and outside of the displacer.

2. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, one of said electrodes projecting into the displacer, a gas relief vent in the displacer, and an auxiliary electrode on the outside of the displacer subject to the changes of the mercury level.

3. In a mercury switch of the class described, a vertical switch envelope, a mercury fill, a plurality of spaced electrodes in the envelope, two of which are substantially the same height and are adapted to be connected to a common lead, a displacer telescoped over one of said two electrodes, a restricted gas passage in the upper part of the displacer, and means for actuating the displacer to change the mercury level.

4. In a mercury switch of the class described, a vertical switch envelope, spaced electrodes in the envelope, a charge of mercury adapted to make or break an electrical circuit through the electrodes according to its level, a displacer telescoped over one of the electrodes for displacing the mercury, a restricted gas passage in the displacer, and an auxiliary electrode on the outside of the displacer also subject to the change of mercury level and adapted to be connected by a common lead to the electrode within the displacer.

5. In a mercury switch adapted to effect a quick make and slow break of an electrical circuit, the combination of a switch envelope, spaced electrodes in the envelope, a mercury fill, a displacer telescoped over one of the electrodes, adapted to make or break an electrical circuit through the electrodes by displacing the mercury and changing its level, a gas relief vent in the displacer, and an auxiliary electrode on the outside of the displacer subject to the change in the mercury level and connected to the electrode within the displacer.

6. In a mercury switch adapted to effect a quick make and slow break of an electrical circuit, the combination of a switch envelope, spaced electrodes in the envelope, a mercury fill, a displacer telescoped over one of the electrodes, adapted to make or break an electrical circuit through the electrodes by displacing the mercury, a porous wall in the displacer permitting gas to be slowly passed therethrough, and an auxiliary electrode on the outside of the displacer subject to changes in the mercury level and connected to the electrode within the displacer.

7. In a mercury switch adapted to effect a quick make and slow break of an electrical circuit, a vertical switch envelope, a plurality of electrodes sealed through the bottom of the envelope and projecting upwardly, two of said electrodes being substantially the same height and being provided with insulating sleeves to a point adjacent their tops, a charge of mercury in the envelope adapted to make or break an electrical circuit between said two electrodes and a third electrode according to the mercury level, a displaced telescoped over one of said two electrodes for changing the mercury level, and a gas relief vent in the displacer.

8. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, two being adapted to be connected to the same side of the circuit and a third to the other side, one of said two first-mentioned electrodes having a time delay element associated therewith and the other of said two electrodes being immediately responsive to the displacing action of the displacer.

9. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, means for delaying the movement of mercury away from one of the electrodes when the displacer is shifted from its lowered position to its raised position, and an auxiliary electrode adapted to be connected to said one electrode and immediately responsive to the displacement action of the displacer.

10. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, means for delaying the movement of mercury away from one of the electrodes when the displacer is shifted from its lowered position to its raised position, and an auxiliary electrode responsive immediately to the displacement action of the displacer.

11. In a mercury switch, a switch envelope, spaced electrodes in the envelope, a gas fill, a quantity of mercury in the envelope adapted to be manipulated to make or break an electrical circuit through the electrodes, a hollow body telescoped over one of the electrodes and presenting a relatively large opening to the mercury and a relatively small opening to the gas, and an auxiliary electrode adapted to be connected to the one over which the hollow body is telescoped, said auxiliary electrode being responsive to changes in the mercury level outside of the hollow body.

12. In a mercury switch, a switch envelope, a pair of spaced electrodes in the envelope, a gas fill, a quantity of mercury in the envelope adapted to be manipulated to make or break an electrical circuit through said electrodes, a hollow body telescoped over one of said electrodes and presenting a relatively large opening to the mercury and a relatively small opening to the gas, and a third electrode in the envelope responsive immediately to changes in the mercury level outside of the hollow body.

13. In a mercury switch, a switch envelope, a pair of spaced electrodes in the envelope, a gas fill, a mercury fill, means for causing the mercury to bridge said electrodes to close the circuit therethrough, a time delay element associated with one of said electrodes including a hollow body telescoped thereover and presenting a relatively large opening to the mercury and a relatively small opening to the gas, and a third electrode in the envelope positioned outside of the body and responsive to changes in the mercury level but not subject to the time delay action of said element.

14. In a mercury switch, a switch envelope, a pair of spaced electrodes in the envelope, a gas fill, a quantity of mercury in the envelope adapted to be manipulated to make or break an electrical circuit through said electrodes, a time delay element associated with one of said electrodes, and a third electrode in the envelope responsive to the movement of the mercury, but not subject to the time delay action of said element, said time delay element including a hollow thimble telescoped over said one electrode and having means for permitting gas to enter and escape therefrom more rapidly in one direction than in the other, whereby the movement of mercury within the body to and from said one electrode is timed accordingly.

CARL H. LARSON.

CERTIFICATE OF CORRECTION.

Reissue No. 20,100.

September 8, 1936.

CARL H. LARSON.

It is hereby certified that error appears in the printed specification of the above numbered patent requiring correction as follows: Page 2, second column, line 66, claim 7, for the word "displaced" read displacer; and that the said Letters Patent should be read with this correction therein that the same may conform to the record of the case in the Patent Office.

Signed and sealed this 1st day of December, A. D. 1936.

(Seal)

Henry Van Arsdale
Acting Commissioner of Patents.

by the mercury for completing an electrical circuit, two being adapted to be connected to the same side of the circuit and a third to the other side, one of said two first-mentioned electrodes having a time delay element associated therewith and the other of said two electrodes being immediately responsive to the displacing action of the displacer.

9. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, means for delaying the movement of mercury away from one of the electrodes when the displacer is shifted from its lowered position to its raised position, and an auxiliary electrode adapted to be connected to said one electrode and immediately responsive to the displacement action of the displacer.

10. In a mercury switch adapted to effect a quick make and slow break of an electrical circuit, a vertical switch envelope, a charge of mercury in the envelope, a magnetically controlled displacer for changing the mercury level, spaced electrodes in the envelope adapted to be bridged by the mercury for completing an electrical circuit, means for delaying the movement of mercury away from one of the electrodes when the displacer is shifted from its lowered position to its raised position, and an auxiliary electrode responsive immediately to the displacement action of the displacer.

11. In a mercury switch, a switch envelope, spaced electrodes in the envelope, a gas fill, a quantity of mercury in the envelope adapted to be manipulated to make or break an electrical circuit through the electrodes, a hollow body telescoped over one of the electrodes and presenting a relatively large opening to the mercury and a relatively small opening to the gas, and an auxiliary electrode adapted to be connected to the one over which the hollow body is telescoped, said auxiliary electrode being responsive to changes in the mercury level outside of the hollow body.

12. In a mercury switch, a switch envelope, a pair of spaced electrodes in the envelope, a gas fill, a quantity of mercury in the envelope adapted to be manipulated to make or break an electrical circuit through said electrodes, a hollow body telescoped over one of said electrodes and presenting a relatively large opening to the mercury and a relatively small opening to the gas, and a third electrode in the envelope responsive immediately to changes in the mercury level outside of the hollow body.

13. In a mercury switch, a switch envelope, a pair of spaced electrodes in the envelope, a gas fill, a mercury fill, means for causing the mercury to bridge said electrodes to close the circuit therethrough, a time delay element associated with one of said electrodes including a hollow body telescoped thereover and presenting a relatively large opening to the mercury and a relatively small opening to the gas, and a third electrode in the envelope positioned outside of the body and responsive to changes in the mercury level but not subject to the time delay action of said element.

14. In a mercury switch, a switch envelope, a pair of spaced electrodes in the envelope, a gas fill, a quantity of mercury in the envelope adapted to be manipulated to make or break an electrical circuit through said electrodes, a time delay element associated with one of said electrodes, and a third electrode in the envelope responsive to the movement of the mercury, but not subject to the time delay action of said element, said time delay element including a hollow thimble telescoped over said one electrode and having means for permitting gas to enter and escape therefrom more rapidly in one direction than in the other, whereby the movement of mercury within the body to and from said one electrode is timed accordingly.

CARL H. LARSON.

CERTIFICATE OF CORRECTION.

Reissue No. 20,100.

September 8, 1936.

CARL H. LARSON.

It is hereby certified that error appears in the printed specification of the above numbered patent requiring correction as follows: Page 2, second column, line 66, claim 7, for the word "displaced" read displacer; and that the said Letters Patent should be read with this correction therein that the same may conform to the record of the case in the Patent Office.

Signed and sealed this 1st day of December, A. D. 1936.

(Seal)

Henry Van Arsdale
Acting Commissioner of Patents.